United States Patent [19]

Allen

[11] 4,172,629

[45] Oct. 30, 1979

[54] KALEIDOSCOPE

[76] Inventor: Clayton H. Allen, 651 Concord Ave., Cambridge, Mass. 02138

[21] Appl. No.: 866,995

[22] Filed: Jan. 5, 1978

Related U.S. Application Data

[63] Continuation of Ser. No. 590,804, Jun. 27, 1975, abandoned.

[51] Int. Cl.$^2$ .............................................. G02B 27/08
[52] U.S. Cl. ......................................... 350/4.1; 353/1
[58] Field of Search ...................... 350/4.1, 4.2; 353/1, 353/2

[56] References Cited

U.S. PATENT DOCUMENTS

| | | | |
|---|---|---|---|
| 3,131,593 | 5/1964 | Grow | 350/4.1 |
| 3,740,112 | 6/1973 | Lundgren | 353/1 |
| 3,809,879 | 5/1974 | Gonzalez | 350/4.1 |
| 3,860,324 | 1/1975 | Gonzalez | 350/4.2 |

*Primary Examiner*—Richard A. Wintercorn
*Attorney, Agent, or Firm*—Charles Hieken

[57] ABSTRACT

A kaleidoscope includes three or four highly polished plain, front-surface mirrors assembled in the form of a prism with a cross section that is an equilateral triangle, a square or a rhombus with the angles between sides of 60° and 120°, having a length 8 to 15 times the linear dimensions of its cross section. An optically opaque cylinder encloses the mirror assembly with opaque end caps providing alignment of the positions for the ends of the mirrors and electric light means for illuminating objects being viewed.

12 Claims, 16 Drawing Figures

KALEIDOSCOPE

This is a continuation of application Ser. No. 590,804, filed June 27, 1975, and now abandoned.

BACKGROUND OF THE INVENTION

The invention described herein relates to the general field of optical instruments called kaleidoscopes, but has improvement of form, shape, and construction which goes significantly beyond the existing state-of-the-art and thereby comprises a superior device that may be used both as an instrument providing relaxation and pleasure for persons of all ages and as a tool to aid designers of patterns for fabric and the like.

Kaleidoscopes of general construction commercially offered as toys for children usually employ a single sheet of mirror-surfaced metal, bent in a Vee and placed in a cardboard tube with end caps having suitable openings for viewing. The angle of the Vee is chosen so that the light from objects placed at one end of the tube will reflect back and forth between the walls of the Vee to produce a succession of images that appear to form a rosette pattern centered on the far end of the crease in the metal when viewed from the opposite end of the tube.

Generally also the far end of the kaleidoscope is fitted with a rotatable drum-shaped cavity having a translucent outer sheet and a transparent inner sheet confining therebetween small varicolored chips of glass, plastic, paper, or the like which when viewed from the opposite end of the kaleidoscope appear to form a colorful rosette. The rosette pattern can be changed and varied by rotation of either the drum or the whole body of the kaleidoscope so that the chips fall into continuingly different and new arrays.

While the patterns so formed are pretty to look at, their range of color patterns is fixed by the colors of the chips enclosed and their shapes and sizes. Interest is not long retained. In recognition of this limitation the more expensive kaleidoscopes have provision for interchanging the drum like section containing the colored chips so that new arrays and colored forms can be viewed. Some kaleidoscopes have a drum section that is openable so that the user can make his own selection of chip materials to be viewed.

The same deficiency is intrinsic in all kaleidoscopes of that type; the material viewed is limited. Even when the user makes his own chips, it is difficult to select materials that will produce suitable chips as regards color transmission and freedom to move and fall into continually changing patterns.

An interesting variation of the kaleidoscope, the so called "teleidoscope", employs two lenses, a large objective lens over the far end and a smaller eyepiece at the opposite end. This addition, in effect, transforms the kaleidoscope into a telescope and things at a distance are brought into clear focus. Within the cardboard tube is a Vee shaped mirror-surfaced reflective sheet of metal having a 90° angle for the Vee. This instrument then produces three reflected images of the scene viewed through the teleidoscope, which holds some interest, but it is quickly recognized that the scene appears as a college of left-handed and right-handed images in which the many items being viewed can be recognized as standing upright, inverted, and left and right. Once these objects become recognizable the interest rapidly wanes.

SUMMARY OF THE INVENTION

The novelty in the new kaleidoscope resides in its highly-polished, front-surfaced mirror members which instead of forming a Vee form an accurately assembled prismatic or pyramidal tube comprising a 3- or 4-sided assembly with a cross section that is an equilateral triangle, a square, or a rhombus with angles of 60° and 120°. Of these, the triangle form is the most easily assembled and durable, least costly, and provides what is considered by many observers, to be the most interesting patterns. The square form, though having one more mirror member and being slightly more difficult to assemble, has the distinction of providing a totally different pattern array that is both interesting for the casual observer and beneficial in expanding the range of patterns available for an artist or designer of prints.

By the use of front surface mirrors there is only one reflected image of an object returned from each reflection, whereas with the use of back surface, glass mirrors there is a principal image reflected from the mirrored back surface and a ghost image returned from the front surface of the glass. Subsequent reflections of image are further confused by ghosts of images and ghosts of ghosts. The result is a very severe confusion and a loss in definition and sharpness such that the multiply reflected pattern is unclear with some parts of the image, particularly the dark portions, severely over-layed with images of adjacent areas.

The use of the mirrored walls having a closed form such as a triangular, square, or rhombus sectioned prism or pyramidal tube permits the reflected field of images (of the object space at the open end of the prism) to spread in all directions and form a broad mosaic pattern rather than a single rosette.

The observed pattern has greatest brightness over the object space seen at the end of the tube. Brightness decreases gradually with distance from the object space, i.e. with increased angle of observation away from the centerline of the kaleidoscope, because of a small loss of light with each reflection. To give the greatest breadth to this pattern the mirrored surfaces preferably have a high polish.

Any irregularity in the mirror surfaces is accentuated by multiple reflection; therefore, it is an important feature of the present invention that the mirrors be flat as well as highly polished in order to obtain many reflections and in order that the lines formed by reflection of the edges of the mirrors at the object end of the kaleidoscope remain in alignment so that the mosaic element shape is maintained and the edges of such images continue to be in accurate alignment in straight lines.

The beauty of the mosaic pattern and the usefulness of the kaleidoscope in perceiving and evaluating the potential print designs depends sharply upon the polish, flatness, and angular relation of the mirrored surfaces.

For a kaleidoscope having 3 mirrors each 1 inch wide and 11 inches long, an error in the alignment of one mirror relative to the other two, even as little as 1° away from the 60° angle of an equilateral triangle, will make an error of approximately 1/60 of an inch in the position of the end of the first reflection of the edge of the object space. While this error may not be considered serious for the first reflection, the error is increased with each subsequent reflection and will increase to approximately 1/16 inch error after 4 reflections, and the mosaic field will be obviously and distractingly distorted.

Although kaleidoscopes with three and four mirrors have been proposed in patents comprising prior art, none teach highly polished flat front surfaced mirrors aligned to the degree of accuracy according to the present invention.

It is important furthermore that the three mirrors be cut so as to meet in the sharpest line contact obtainable along their mating edges, otherwise a line of separation is visible along each of these boundaries. These lines reflected in the mirrors form an array of lines radiating out of the masaic pattern oriented in such a direction as to meet at a point at the center of the object space if they were extended through and beyond the image plane. These lines become highly distracting when the mirrors do not meet sharply as, for example, if there were burrs on the edges of the mirrors due to cutting or if lint or other foreign material were trapped between edges of the mirrors at assembly.

If the mirrors were formed by bending a single sheet of metal, the curved portion at each crease would form a large visible line and the distortion commonly accompanying such a bending process would severely detract from the quality of the images formed unless some unusual substantially distortionless bending process could be devised. While a kaleidoscope mirror assembly formed by such a substantially distortionless bending process falls within the scope of the present disclosure, a preferred embodiment illustrated in FIGS. 1-5 employs three or four separate flat metal mirror sheets held together by an assembly means that assures the accurate alignment and tight positioning of the mirror plates against each other. Said mirror plates are oriented in such a way that any burrs left from cutting the mirror sheets are oriented away from the adjacent mirror, thereby allowing the burr-free edge of one mirror to be pressed against the face of the adjacent mirror and held in position by spacers (of cardboard, molded plastic or other material) that provide for both the maintenance of accurate angular alignment and the suitable spring force to prevent the mirrors from separating.

The kaleidoscope described herein permits the viewing of any object or objects that can be placed close to the object end of the kaleidoscope and viewed from the opposite end. The beauty of the observed mosaic pattern is far in excess of that which might be expected from the casual observation of the objects as normally viewed. Heat light intensity at least over part of the object viewed adds greatly to the beauty of the mosaic and increases the dynamic range of the pattern viewed, bringing out highlights and shadows in various degrees of contrast. Objects so viewed "take on colors" that would ordinarily not be expected. Although these colors are indeed present with or without the kaleidoscope, the stripping away of all but the scene at the objective end of the kaleidoscope concentrates attention on the limited scene and spreads that scene as a broad harmonious mosaic. Even colors that would at first be expected to clash violently seem to augment and complement each other in the mosaic pattern so formed.

Even a material of a single color illuminated with white light shows depths of color increases in folds that would not be expected. The effect of illumination, reinforcement by reflection and the effects of partial transmission of light through the specimen examined all become vivid experiences that give pleasure and could be of great assistance to print designers and to artists interested in the absolute color of objects as they change from positions of full illumination to shadowed and shaded positions.

Suitable light may be obtained from any conventional light source. Colored light or colored filters for the light add interest. To aid in the observation of the effects of illumination and to make strong illumination readily available, a light source may be attached as an added feature for this kaleidoscope. The light source described in greater detail in connection with the accompanying drawing provides a very brilliant illumination on one or more areas of the viewed object. Interesting shadowed areas are created as the light intensity drops off away from the center of the illuminated area or areas.

Provision is made for an optional light filter that may be snapped into place and rotated to give varying colors as well as unfiltered white light.

An object of the present invention is to provide a tool for aiding in the design of new and original colorful print patterns.

A further object is to provide a visual means for observing a given print pattern rendered in a number of color ranges or for observing a pattern continuously varied in color so as to facilitate the rapid selection of a set of color combinations that would be well balanced and compatible with pigments or dyes available and with current styling demands.

A further object is to provide a safe, durable and easily usable toy that will give pleasure and an appreciation of color, color patterns, color harmony and a greater awareness of the color, patterns and beauty existing in ordinary objects commonly handled and rarely observed closely enough to recognize their intrinsic beauty.

BRIEF DESCRIPTION OF THE DRAWING

The present invention will now be described in connection with the accompanying drawing FIG. 1 of which is a perspective view partly in section of a three-mirrored embodiment.

W—white, R—red, B—blue, O—orange.

Figure 5:
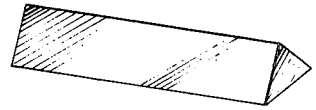
Figure 6:

FIG. 5 is a perspective view of an embodiment of the invention comprising a single hollow molded plastic unit having plane polished interior faces aluminized to maximize reflection quality; and FIG. 6 is a perspective view of an embodiment of the invention comprising a single solid water-clear plastic member having plane polished ends with plane polished sidewalls.

DETAILED DESCRIPTION OF PREFERRED EMBODIMENTS

Figure 1:
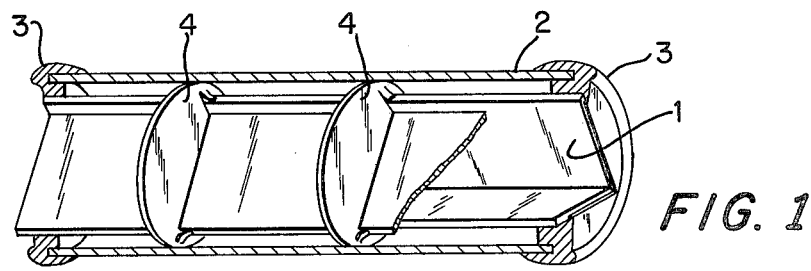
FIG. 1A shows a single rectangular mirror in perspective.
FIG. 1B shows a single alternative, truncated-triangular, of trapezoidal mirror in perspective.
Figure 1B:
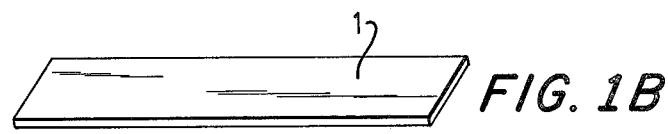
Figure 1A:
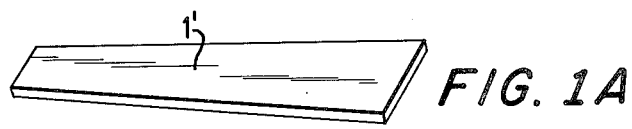

Referring to FIGS. 1, 1A and 1B, a preferred embodiment of the said kaleidoscope is comprised of three or four front-surfaced mirror members 1 or 1' held in a tube by means of end caps 3 and a number of spacers 4.

Figure 2A:
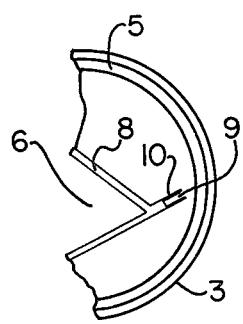
FIG. 2A is a partial plan view of the end cap of FIG. 2.
Figure 2:
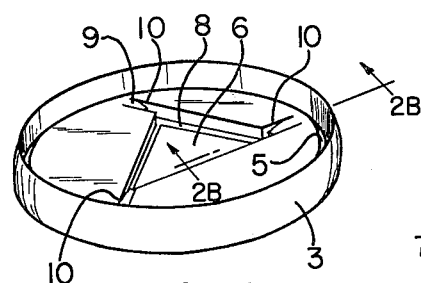
FIG. 2 is a perspective view of the end cap.
Figure 2B:
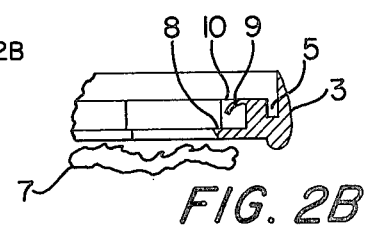
FIG. 2B is a partial section of the end cap indicated as section 2B in FIG. 2.

In FIGS. 2, 2A and 2B, a groove 5 in each end cap 3 receives the tube 2 of FIG. 1. An opening 6, triangular for a 3-sided mirror assembly and square or rhombus shaped for a four-sided mirror assembly, holds the ends of the mirror members, and admits bringing objects 7 to be viewed close to the object end of the mirrored passage formed by the mirror members 1 and admits viewing of the mirrored passage from the observation end of the kaleidoscope. Said opening 6 is provided on all edges with a bevelled lip 8 that extends inward a distance equal to approximately $\frac{2}{3}$ of the thickness of the mirror members 1 to hold the mirror members from moving axially and not in any way being visible from the opposite end of the kaleidoscope.

Figure 2C:
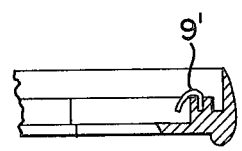
FIG. 2C is an alternative similar section.

A small spring tab 9, molded as part of the end cap 3 at the end of each end slot 10 is used to increase the force holding mirror members 1 in intimate contact. Alternatively a small separate spring member 9' may be used instead of molded spring tab 9 as shown in FIG. 2C.

Figure 3:
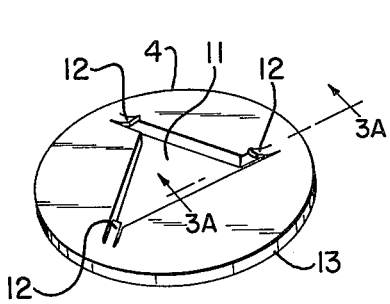
FIG. 3 is a perspective view of one spacer.
Figure 3A:
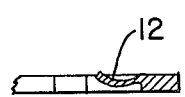
FIG. 3A is a partial section indicated as section 3A in FIG. 3.
Figure 3B:
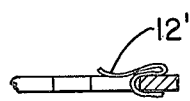
FIG. 3B is an alternative similar section.
Figure 4A:
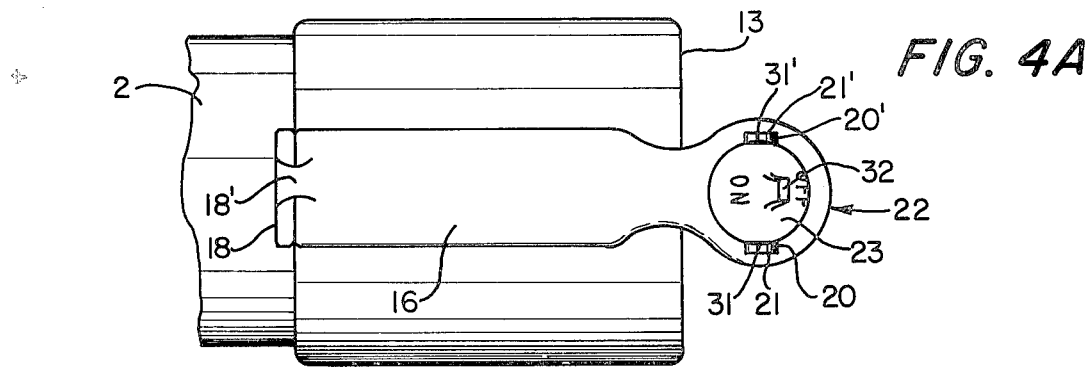
FIG. 4A is a top view of the assembly shown in FIG. 4.
Figure 4:
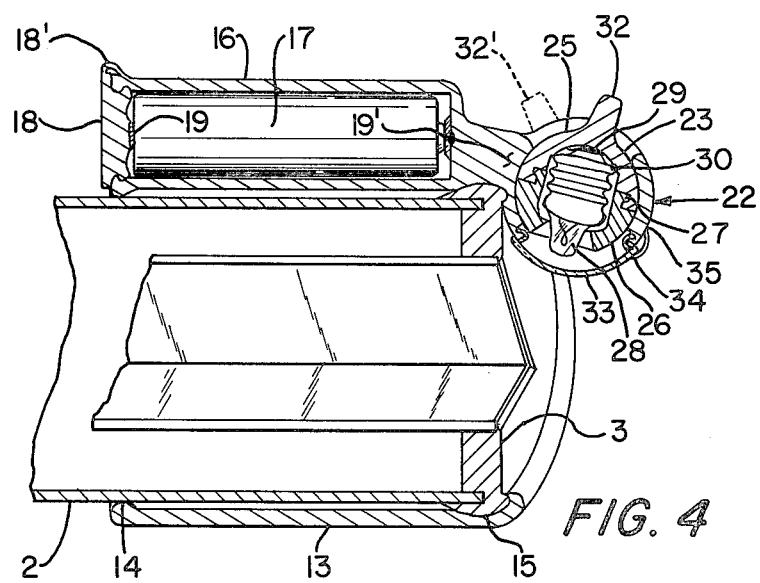
FIG. 4 is a sectioned perspective view of a preferred embodiment of a light source attachment assembled to a fragment of said kaleidoscope also shown in a sectioned perspective view.
Figure 4C:
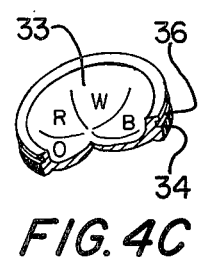
FIG. 4C is a partially sectioned perspective view of the light filter showing qualitatively the positioning of varied colored sections encoded as follows.
Figure 4B:
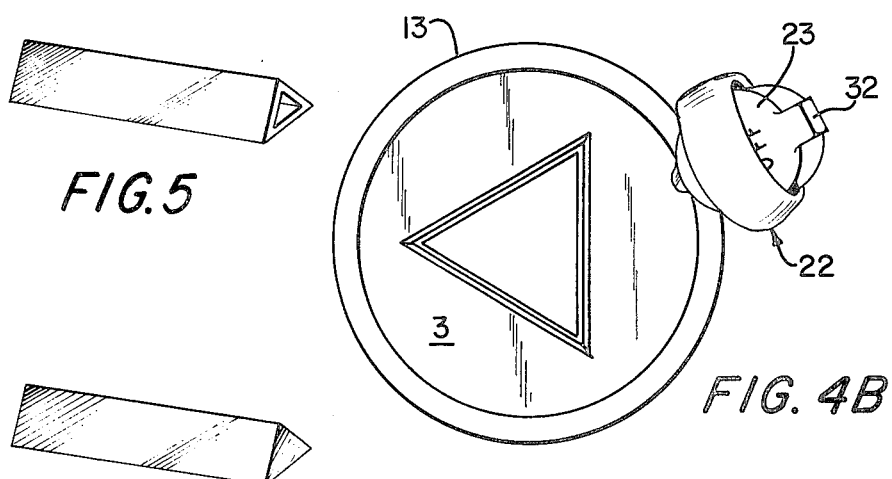
FIG. 4B is an end view of the assembly shown in FIG. 4 with the light filter removed.

In FIGS. 3, 3A and 3B, an opening 11 in the spacer 4, triangular for a 3-sided mirror assembly and square or rhombus shaped for a 4-sided mirror assembly, admits the passage of the mirror members as a group without contact with the polished front surfaces. The flat surfaces of opening 11 press against the back sides of mirror members 1 and spring tabs 12, molded as part of the spacer 4, or spring clips 12', force the mirror members into intimate contact at their long edge. The size and shape and angular alignment of the mirror assembly is determined by the flat surfaces of the spacers and the pressure or force exerted by the spring tabs 12 or clips 12'. The dimensions of the separators 4 must correspond accurately with dimensions of the end caps. It is not necessary that the outer circumference 13 of spacers 4 fit accurately against the inside wall of tube 2; for some applications, it may be preferably for the spacer circumference to be slightly smaller than the circumference of the tube to facilitate assembly and to permit the accuracy of alignment to be determined solely by the end caps. However, in some applications it may be preferable to add a band of adhesive material to join the spacers and tube with a flexible mastic that will congeal or solidify, after the final positioning has been accomplished by assembly of the end caps, as a means of adding rigidity and stability to the completed assembly.

End caps 3 are fastened to the ends of tube 2 by a suitable adhesive laid into groove 5 of the end cap immediately prior to assembly of the end caps to the tube. The dimensions of the tube must be controlled so that, at assembly, the end caps will press firmly against the ends of the mirror assembly along the bevelled flanges 8.

Referring to FIGS. 4, 4A, 4B and 4C a light attachment comprising a body 13 made of a semi-rigid material such as polypropylene that fits over the end cap 3 and along the body of the kaleidoscope tube 2 with a lip 14 that rests lightly in contact with the tube and a shallow groove 15 that fits the contour of the rim of the end cap 3, provides a secure positioning of the light attachment on the object-end of the kaleidoscope. A battery compartment 16 for holding a penlight battery 17 may be molded as an integral part of the body 13 and provided with a snap-in end cap 18 that may be permanently connected to the compartment wall by a molded hinge 18'. Within the battery compartment are suitable spring loaded battery-contacts 19 and 19', connected by suitable wires or other form of electrical connectors to the spring clips 20 and 20' located in recesses 21 and 21' in the partially spherically shaped receiver 22 for the light assembly 23.

Said light assembly is comprised of a pair of spherically shaped halves 25 and 26 that snap together by means of a snap joint 27 and confine a common flashlight lightbulb 28. Said lightbulb is held against spring contacts 29 and 30 such as are familiar in the art of flashlight design which are connected (by wires or the like not shown), respectively to electrically conducting areas on hubs 31 and 31' that make electrical contact with said spring clips 20 and 20' when said light assembly is snapped into the partially spherical shaped receiver 22 and when the handle 32 is moved away from the "off" position, indicated by phantom lines at location 32'. Said handle 32 is used to move the light assembly so as to direct light at desired locations on any object being viewed. Said light assembly moves in an arc lying in the plane of the section shown in FIG. 4 and centered on the axis of the hubs 31 and 31'. At least one of said spring contacts 20 or 20' breaks contact with the corresponding conducting area of hub 31 or 31' when the handle 32 is brought to the off position 32'. The whole body 13 of the light attachment can be rotated about the axis of the kaleidoscope to change lighting direction on the object as desired.

A light filter 33 is provided as an alternative snap-in part that may be either a single molded lens of a transparent plastic such as polystyrene, polybutyrate or an inexpensive optically clear material that may be stained with filtering dies of suitable colors. Areas of clear white, blue, red, orange, etc. may be produced on one filter lense and appropriate colored filter positioned under the light by using the knurled rim 34 of the filter 22. Alternatively a set of filters each with a different color or hue may be snapped into position and held by ridge 35 on receiver 22 and groove 36 in filter 33. Many alternative ways of inserting changing and holding filters are familiar to those skilled in the art and lie within the scope of this invention.

The above described preferred embodiment and other preferred embodiments of the invention may alternatively or further comprise one or more of the utilization of deposition aluminized (or otherwise metallized) plastic in lieu of metal sheets as mirrors; the utilization of an integrally formed hollow prism preferably of molded plastic and with plane polished and/or metallized, preferably aluminized, interior faces to maximize reflection quality as shown in FIG. 5; and as a further alternative, the utilization of a water-clear plastic member, having plane polished ends with plain polished sidewalls as mirror material, in lieu of assembled mirror sheets as shown in FIG. 6.

As used herein, "linear dimensions of cross-section" refers to maximum length of side of the cross-sectional polygonal figure defined by the prismatic mirror subassembly.

There has been described novel apparatus and techniques for providing kaleidoscopic patterns. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed.

What is claimed is:

1. Kaleidoscopic apparatus comprising,
   at least three flat highly polished plane, front-surface mirrors for substantially all angles of incidence in the form of a prism with a cross section that is a regular polygon and the prism having a length within the range of 8 to 15 times the linear dimensions of said cross section with adjacent mirrors meeting in sharp line contact along their mating edges and forming equal angles between mirrors for providing a reflected field of images of object space at an open end of said prism to spread in all directions and form a broad mosaic pattern with edges of said images in accurate alignment in straight lines,
   an optically opaque cylinder surrounding said prism,
   and means suppoted by said cylinder for supporting the ends of said prism for providing a view of an object near an objective end of said prism from the opposite end of said prism through the prism.

2. Kaleidoscopic apparatus in accordance with claim 1 wherein said mirrors comprise sheets of polished aluminum.

3. Kaleidoscopic apparatus in accordance with claim 1 wherein the width of each of said mirrors is between ½ inch and 1½ inch and the length of each of said mirrors is between 6 and 15 inches.

4. Kaleidoscopic apparatus in accordance with claim 1 wherein the angle between adjacent mirrors is within the range of 60°±1° for a triangular cross section.

5. Kaleidoscopic apparatus in accordance with claim 1 wherein said prism is a truncated pyramid of small taper having an opening at one end that is of larger area than the opening at the other end.

6. Kaleidoscopic apparatus in accordance with claim 1 wherein the mirrors comprise sheets of metalized plastic.

7. Kaleidoscopic apparatus in accordance with claim 1 wherein the mirrors comprise a single hollow molded plastic unit having plane polished interior faces metalized to maximize reflection quality.

8. Kaleidoscopic apparatus in accordance with claim 1 wherein the mirrors comprise a single solid water-clear plastic member having plane polished ends with plane polished sidewalls acting as front surface mirrors when viewed by looking through said prism from either end.

9. Kaleidoscopic apparatus in accordance with claim 1 wherein one of said ends is a viewing end and the other is an objective end and further comprising a light assembly having a body attachable to said cylinder, and means for supporting said body in a position that is fixed relative to the length of said cylinder while being rotatable about the axis thereof,
said light assembly including means for supporting a battery and electrically connecting said battery to a socket assembly for receiving a light bulb,
and means for supporting said socket assembly for rotation through an angle about an axis perpendicular to the axis of said cylinder.

10. Kaleidoscopic apparatus in accordance with claim 9 wherein said socket assembly receiver includes a lip for receiving and positioning a light filter means for providing colored light for illuminating objects to be viewed through said apparatus.

11. Kaleidoscopic apparatus in accordance with claim 1 wherein the angle between adjacent mirrors is within the range of 90°±1° for a square cross section.

12. Kaleidoscopic apparatus in accordance with claim 1 wherein three separate planar mirror members are arranged in a longitudinally overlapping configuration having an equilateral triangular cross section for reflecting light internally and further comprising assembly means including,
   end caps fitting on each end of said cylinder each formed with an equilateral triangular opening slightly larger than that of said configuration for accommodating said configuration,
   each of said end caps having a recessed triangular section on its inner side having walls parallel to the sides of said triangular opening for receiving and containing the ends of said three separate plane mirror members and said recess having three extensions to accommodate the extended width of each plane mirror member arising from said overlapping configuration,
   spring members in each of said recess extensions for urging a respective plane mirror member toward its adjacent overlapping mirror member so that in the completed assembly each mirror member is urged into intimate contact with said adjacent overlapping mirror member to minimize the visual size of the joint between said mirror members and hold said mirror members firmly against the walls of said recess so as to maintain accurate angular alignment of said mirror members,
   at least one intermediate spacer inside said cylinder intermediate said end caps for securely holding said mirror members in intimate contact and accurate angular alignment along their entire length,
   said spacer comprising a disc of rigid material having an equilateral triangular opening at its center for securely accommodating the outside of said mirror members,
   the latter opening having slot extensions for each side of the latter opening for accommodating the extended width of said overlapping mirror members,
   and additional spring means at the end of each of the latter slots for pressing against the edge of a respective mirror member extending into the latter slot for urging a respective mirror member into intimate contact with said adjacent overlapping mirror member to minimize the visual size of the joint between said mirror members and hold said mirror members firmly against the walls of said equilateral triangular opening in said spacer so as to maintain accurate alignment of said mirror members.

* * * * *